Nov. 3, 1959 J. D. H. HELMS 2,910,887
COLLAPSIBLE AND ADJUSTABLE STEERING COLUMN
Filed Aug. 8, 1956 3 Sheets-Sheet 1
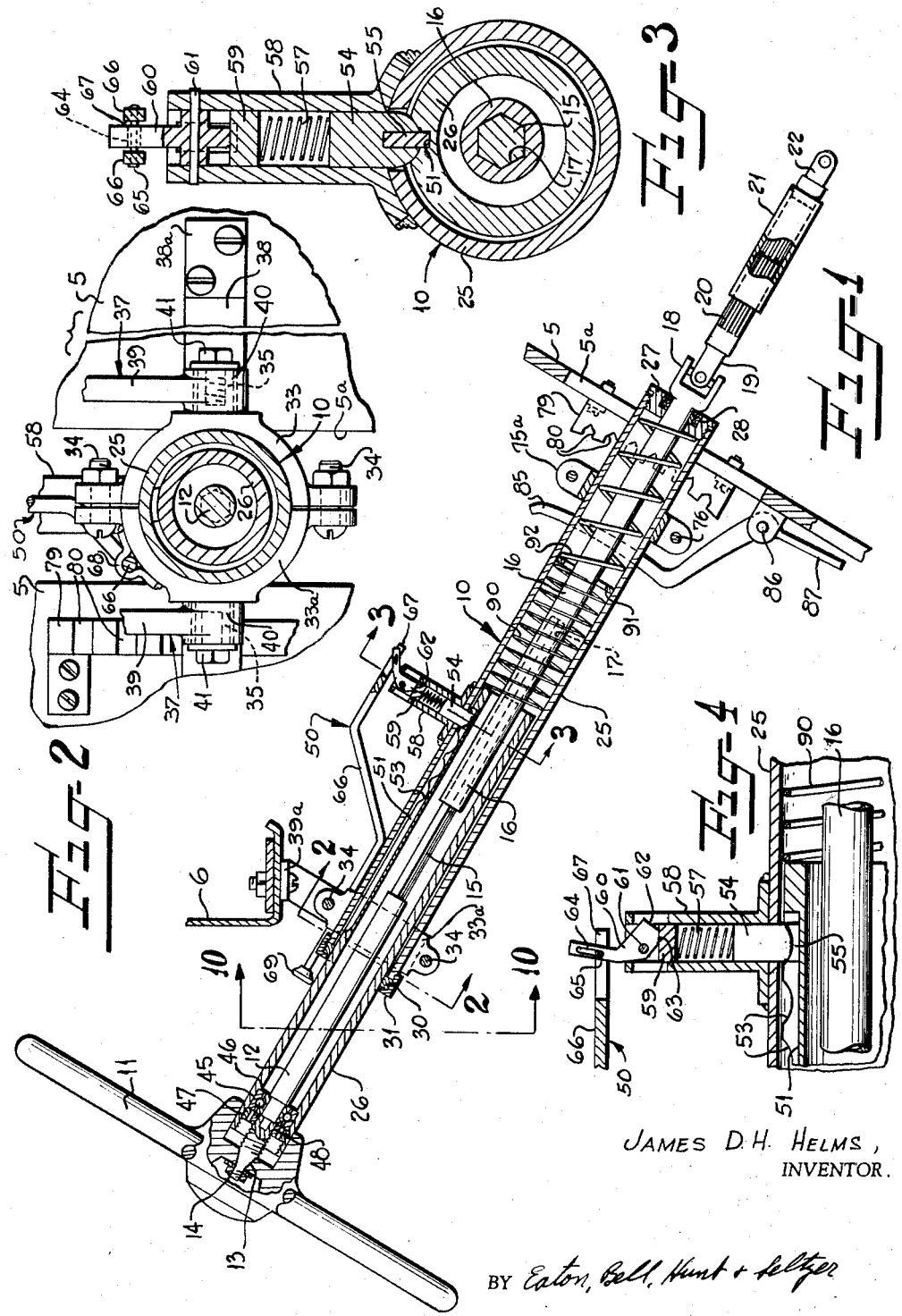
JAMES D. H. HELMS,
INVENTOR.
BY Eaton, Bell, Hunt & Seltzer
ATTORNEYS Nov. 3, 1959 J. D. H. HELMS 2,910,887
COLLAPSIBLE AND ADJUSTABLE STEERING COLUMN
Filed Aug. 8, 1956 3 Sheets-Sheet 2
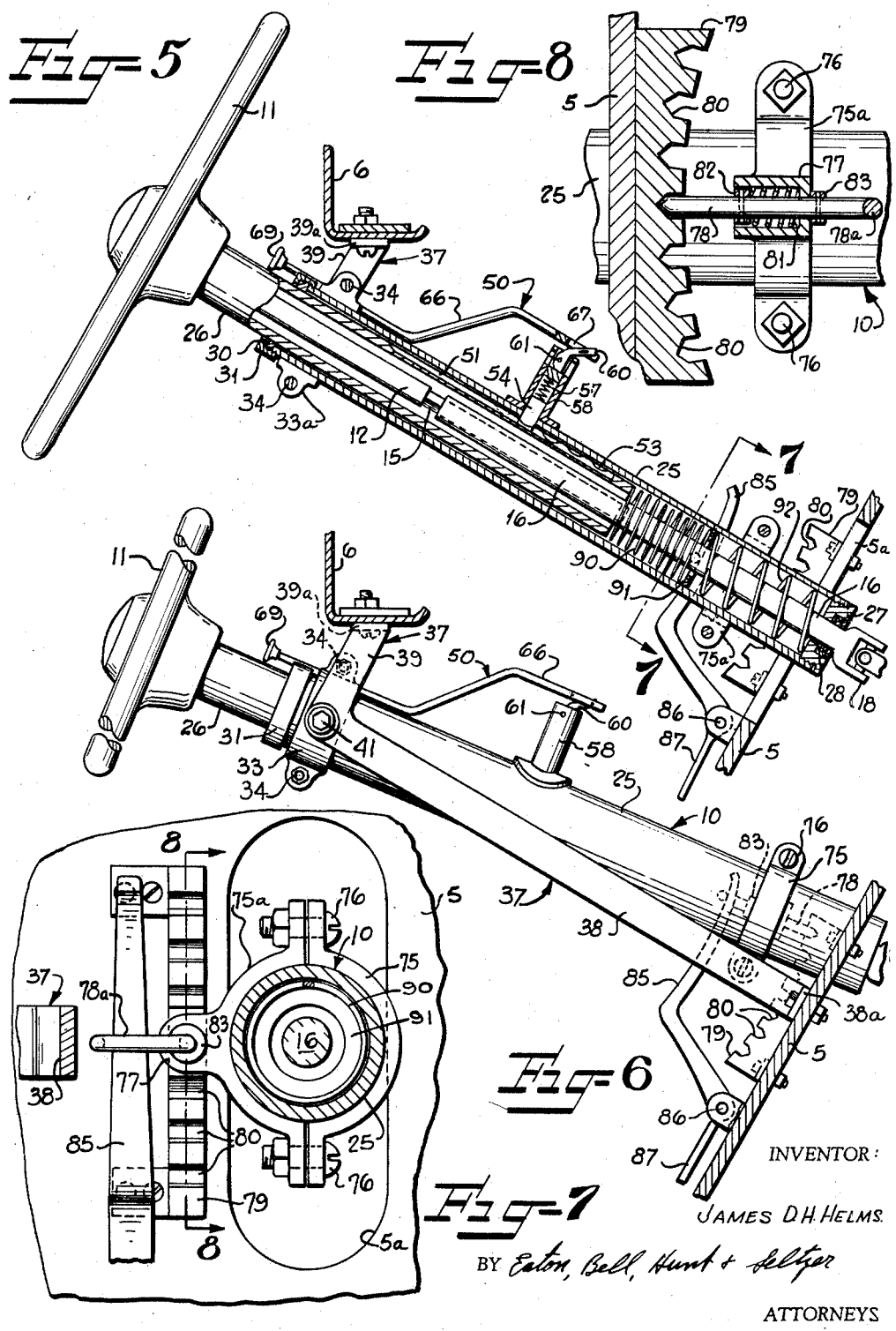
INVENTOR:
JAMES D.H. HELMS
BY Eaton, Bell, Hunt & Seltzer
ATTORNEYS

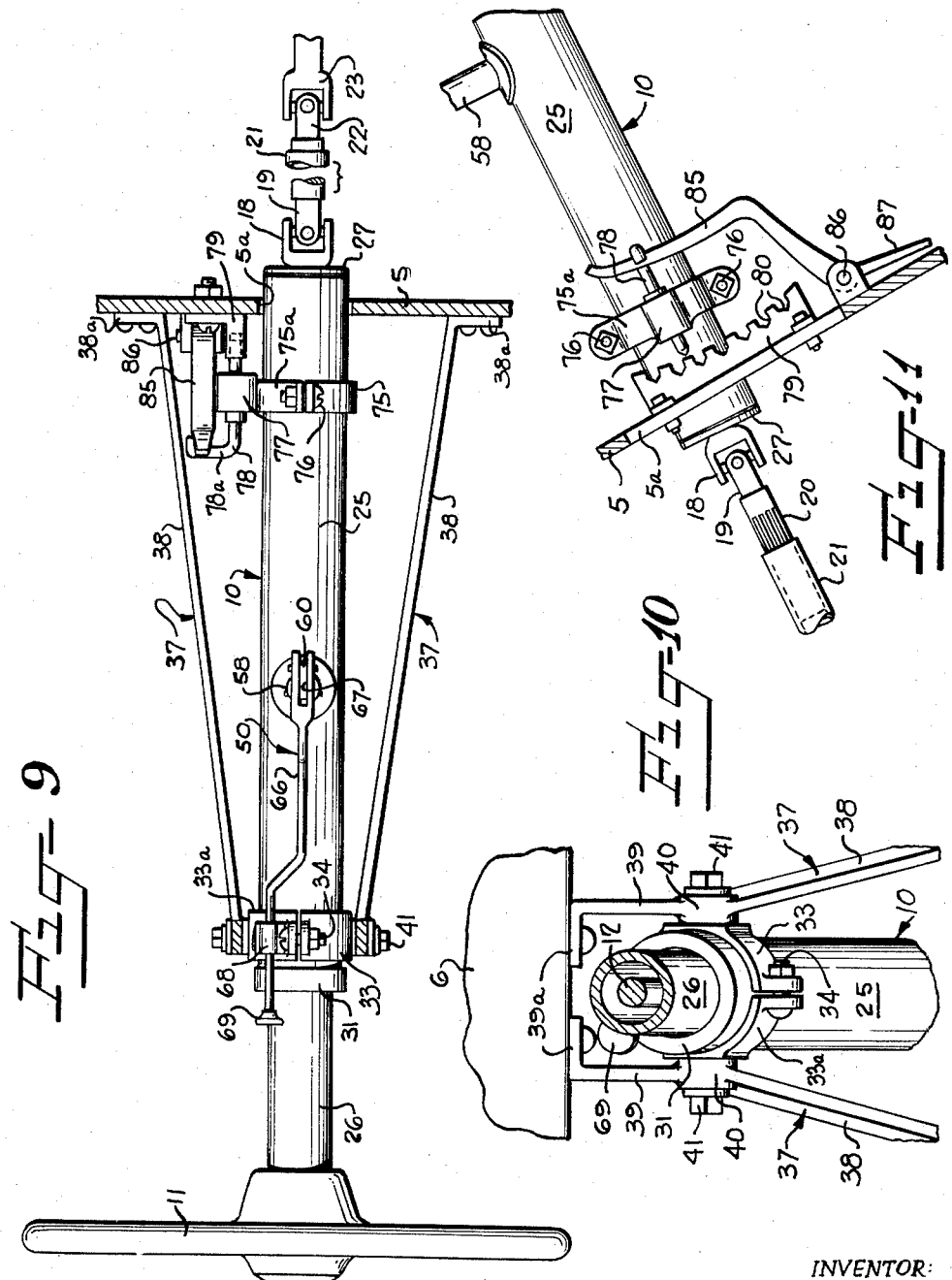

United States Patent Office 2,910,887
Patented Nov. 3, 1959

2,910,887

COLLAPSIBLE AND ADJUSTABLE STEERING COLUMN

James D. H. Helms, Monroe, N.C.

Application August 8, 1956, Serial No. 602,794

16 Claims. (Cl. 74—493)

This invention relates to a new and improved steering column for motor vehicles, motor boats, or the like. The primary object of this present invention is to provide an improved steering column designed primarily for motor vehicles, which is adapted to be shifted longitudinally against a restraining or cushioning mechanism in the event of an accident whereby the driver behind the steering wheel thrown upon the steering column will be saved from the serious injury which frequently results in motor vehicle accidents.

Another object of this invention is to provide a steering column which can be adjusted longitudinally of itself, so that the steering wheel is always at a comfortable distance from the seat for different sizes or heights of drivers. Heretofore, a driver of a motor vehicle has only been able to adjust the front seat of the motor vehicle to suit his own particular driving habits.

It is a fact that on the newer models of motor vehicles, the front seats are adjustable longitudinally of the motor vehicle and also a vertical adjustment has been added. However, this varies the "leg room" available to the driver.

Therefore, it is a further object of this invention to provide a steering column in which a vertical adjustment of the steering wheel is also made possible to the driver of the motor vehicle. On many motor vehicles the uppermost part of the steering wheel frequently obscures the vision of motor vehicle drivers, particularly short drivers, and makes it necessary for the driver to look over the top of the steering wheel or underneath it. With the type of steering column provided in my invention, this defect is overcome and a steering column is provided which meets the safety requirements of present day driving by substantially reducing driver fatigue.

Some of the objects of the invention having been stated, other objects will appear as the description proceeds, when taken in connection with the accompanying drawings, in which—

Figure 1 is a longitudinal sectional view through the improved steering column;

Figure 2 is a transverse sectional view taken along the lines 2—2 in Figure 1;

Figure 3 is a transverse sectional view taken along the lines 3—3 in Figure 1;

Figure 4 is an enlarged view of the longitudinal release mechanism in a relaxed state, or in the position it would occupy when the driver is making a longitudinal adjustment of the steering column;

Figure 5 is a longitudinal vertical sectional view similar to Figure 1 but showing the steering column after it has been adjusted to its shortest length longitudinally;

Figure 6 is an elevation looking in the same direction as Figure 1 but showing the steering column in the position it would assume after the steering wheel has been adjusted vertically, and in this case, towards the driver's lap;

Figure 7 is a transverse sectional view taken along the line 7—7 in Figure 5 and showing part of the vertical adjustment mechanism for the steering column in elevation;

Figure 8 is a longitudinal sectional view taken along the lines 8—8 of Figure 7;

Figure 9 is a plan view of the improved steering column as it appears in its fully extended position as in Figure 1;

Figure 10 is a transverse sectional view taken along the lines 10—10 in Figure 1;

Figure 11 is a side elevation of the vertical adjustment mechanism looking in the same direction as Figure 8.

Referring more specifically to the drawings, and more particularly to Figures 1, 5 and 6, it will be seen that the improved steering column 10 extends through a conventional fire wall or inclined floor portion 5 found on any type of motor vehicle to where it is attached to conventional linkage, for turning the front wheels of said motor vehicle, said linkage not being shown in the drawings. As shown in Figures 1, 5 and 6, the improved steering column is secured by brackets, to be later described, to a part of the motor vehicle designated by the reference character 6 which could be the dash or instrument panel of a conventional motor vehicle or a bracket suspended from the sides of said motor vehicle.

The improved steering column is broadly designated by the reference character 10, having a conventional steering wheel or ring 11 secured in a conventional manner to a tapered and reduced portion 13 of an upper telescopic shaft 12 by a nut 14. The upper shaft 12 may be circular in cross-section and have a reduced lower portion 15, which may be splined or, as shown in Figures 1 and 3, substantially hexagonal in cross-section. The reduced portion 15 of the upper shaft 12 mates with a bore 17 in a lower shaft 16. The shafts 12, 16 may be collectively termed as a telescopic two-part steering rod. The bore 17 (Figure 3) is of the same shape as the reduced portion 15 or hexagonal, permitting the lower shaft 16 to be rotated in either direction when the upper shaft 12 is rotated by the steering wheel 11.

As is best shown in Figure 1 the upper shaft 12 can move longitudinally and in axial alinement with the shaft 16. At the lower end of the lower shaft 16 a yolk 18 is secured, yoke 18 mating with another yoke 19, to form a universal joint. Made integral with the yoke 19 is a splined shaft 20. The splined shaft 20 mates with a splined bore in a hollow tubular shaft 21 suitably secured to a yoke 22. The yoke 22 being one-half of a universal joint. The other half 23 of the universal joint (Figure 9) is connected to suitable linkage, not shown, for turning the front ground wheels of the motor vehicle. It is thus seen (Figure 1) that longitudinal or telescopic movement may be effected between the universal joints 18, 19 and 22, 23 by the splined shaft 20 moving longitudinally along its axis and mating with the splined bore in the tubular shaft 21. The purpose of this longitudinal or telescopic movement will be later described.

*Longitudinal adjustment*

The improved steering column 10 comprises a two-part housing including an outer or lower tubular shaft or main housing part 25, which is telescopically penetrated by an inner or upper tubular shaft or auxiliary housing part 26. The outer tubular shaft 25 is provided with a plug or abutment 27 at its lowermost end, the plug 27 being threadably secured to the outer tubular shaft 25. The plug 27 has an annular bearing 28 mounted therein which is penetrated by the lower shaft 16.

Again referring to Figure 1, the outer tubular shaft 25 has a bearing or packing 30, held in engagement with its upper end by a cap or gland 31 being threaded onto the outer tubular shaft 25. The packing 30 has a somewhat smaller inner diameter than the inner diameter of the outer tubular shaft 25, to permit sliding or telescopic movement between the outer and inner tubular shafts 25 and 26.

Immediately below the cap or gland 31, a split circular ring is clamped to the outer tubular shaft 25. The split ring comprising two halves 33 and 33a, and being clamped to the outer tubular shaft 25 as by screws or bolts 34. As best shown in Figure 2, the split circular ring 33, 33a has a pair of pivot pins 35 thereon forming a trunnion. A pair of steering column supporting brackets, broadly designated at 37, having downwardly and forwardly inclined arms 38 and each of which has a turned-out foot portion 38a, are securely fastened to the fire wall 5 as by bolts or rivets. The steering column support brackets also have vertical arms 39, substantially at right angles to the longer arms 38 with turned-out portions 39a.

The latter portions are penetrated by bolts or other means which securely fasten said arms 39 to the dash or bracket 6 of the motor vehicle. Boss portions 40 are provided on the brackets 37 at the junctures of the arms 38 and 39, which boss portions 40 have a bore in which the pivot pins or projections 35 on the ring split circular 33, 33a are positioned and held, as by screws 41. The projections 35 serve as an axis about which the steering column 10 may be adjusted. It is thus seen from the foregoing description, that the outer tubular shaft 25 is securely fastened by the brackets 37 to the motor vehicle.

Inserted in the inner tubular shaft 26 at its uppermost end is a bearing 45, whose outer race is restrained from longitudinal movement therein, between a shoulder 46 in the inner tubular shaft, and an externally threaded nut 47. As best shown in Figure 1 the inner race of the bearing 45 is held against a reduced shoulder portion of the upper shaft 12 by a nut 48 threaded into the upper shaft 12. It is thus seen that the inner tubular shaft 26 is securely locked through the bearing 45 to the upper shaft 12. Thus, upon any longitudinal movement of the inner tubular shaft 26 a like amount of movement will be imparted to the shaft 12.

Longitudinal adjustment mechanism, broadly indicated at 50, is provided so the inner tubular shaft 26 can be moved longitudinally and yieldably locked in position inside the outer tubular shaft 25 of the steering column 10. The longitudinal adjustment mechanism 50 serves two purposes, the first of which is to provide different positions at which the steering wheel 11 can be locked, between the driver and the fire wall 5, and secondly, to provide stop means whereby the inner tubular shaft 26 is restrained from rotation, upon the steering wheel 11 being turned in either direction. Notches or concavities 53 are provided in the outer and upper surface of the inner tubular shaft 26. A keyway 51, Figures 3 and 4, is also provided in the upper surface of the inner tubular shaft 26. The keyway 51 runs longitudinally through the notches 53 as viewed in Figure 1.

A rounded lower portion of a pawl, detent or stop pin 54, is adapted to seat in the notches 53, said pawl 54 having secured to its lower end a key 55 which engages the keyway 51. The key 55 engages the keyway 51 at all times to prevent rotation of the inner tubular shaft 26, as best shown in Figures 1, 3 and 5. It should be noted that the lower end of keyway 51 is closed to provide a shoulder to engage said key 55 and limit the extent of upward movement of the upper tubular member or shaft 26. The pawl 54 is held in engagement with the notches 53 of the inner tubular shaft 26 by a compression spring 57. The compression spring 57 and pawl 54 are confined in a small radially projecting tubular housing or block 58 mounted on or integral with the upper and outer surface of the outer tubular shaft 25. A piston 59 rests upon the upper end of the compression spring 57, and is normally held in engagement with the spring 57 by a cam on a lever 60. The cam lever 60 is pivotally mounted in the block 58, as at 61, and has, at its lower end, cam surfaces 62, 63 to be later described.

The upper end of the lever 60 is provided with a slot 64 penetrated by a pin 65 carried on the end of a release link or control rod 66 of the longitudinal adjustment mechanism 50. The link 66 has a slot 67 in its outer end through which the upper arms of the lever 60 extends. The link 66 is mounted for longitudinal sliding movement, by passing through a bracket 68 secured to the half ring 33a (Figures 2 and 9). A knob 69 is provided on the link 66 opposite from the slotted end 67, within easy reach of the driver of the vehicle for imparting longitudinal sliding movement to the rod 66. The cam surfaces of the lever 60 are provided at different radii from the pivot point 61 of the lever 60. As is best shown in Figure 1, the cam surface 62 is in engagement with the piston 59, and in Figure 4, the cam surface 63 is in engagement with the piston 59.

Again referring to Figure 1, when the cam surface 62 engages the piston 59, the piston 59 is moved closer to the detent 54 thereby compressing the spring 57 and locking the detent in engagement with one of the notches 53. It should also be noted that the link 66 has been pushed forward when the cam surface 62 engages the piston 59. Referring to Figure 4, the link 66 has been pulled back or longitudinally of the steering column 10 by the driver and the cam surface 63 is now engaging the piston 59. In this position, the pressure on spring 57 is released so the steering wheel 11 can be pushed forward or pulled toward the operator or driver because of the relaxed pressure on the spring 57, allowing the pawl 54 to ride freely from one notch 53 to another. It should also be noted that, with any movement of the inner tubular shaft 26 within the outer tubular shaft 25, a like amount of movement will be effected between the upper shaft 12 and the lower shaft 16 of the two-part steering rod by the hexagonal portion 15 of the upper shaft 12 moving within the bore 17 of the lower shaft 16.

*Vertical adjustment*

It has already been stated in the foregoing description how the steering column can be pivoted about the axis point 35 of the ring or trunnion 33, 33a for raising and lowering the steering wheel 11 in a vertical manner away from and toward the lap of the driver. As best shown in Figures 1, 5, 6, 7, 8, 9 and 11, a split ring is also provided at the lower portion of the outer tubular shaft 25. This ring is made up of two halves 75 and 75a, which are suitably clamped about the outer tubular shaft 25 as by bolts 76.

As best shown in Figure 7, a spring housing or boss portion 77 is provided intermediate the half-ring 75a, said boss portion 77 having a cavity through which a release pin 78 or latch projects. The release latch 78 is held in engagement with a curved rack 79, having notches 80 therein, by a compression spring 81 mounted inside the boss portion 77 of the half-ring 75a, and is confined between a cavity closure wall, of the boss portion 77 and a washer 82 mounted on the lower end of the pin 78.

As is best shown in Figure 8, the compression spring 81 normally urges the pin 78 into engagement with a corresponding one of the notches 80 of the curved rack 79. A stop washer 83 mounted on the release pin and, outside of the cavity closure wall of the boss 77 limits travel of the release pin by the compression spring 81.

The end of the stop pin 78 opposite from the rack 79 has an L-shaped portion 78a thereon. The L-shaped portion 78a of the release pin 78 is engaged by an arm 85 of a foot release mechanism in the form of a lever pivotally mounted on the fire wall, as at 86. An arm or foot pedal 87 integral with the release lever 85 serves as an actuating member for the release lever 85. Upon the foot pedal 87 being depressed by the foot of the driver, the lever 85 is moved in a counter clockwise manner in Figure 6 to engage the L-shaped portion 78a of the pin 78, which in turn, causes the washer 82 (Figure 8) to compress spring 81. This results in the latch 78 being disengaged from one of the notches 80 of the rack 79, thereby enabling the driver to move the steering wheel 11 vertically about the axis 35 of the rings 33, 33a.

When the required degree of elevation has been determined by the driver, he removes his foot from the foot pedal 87. The pin 78, through action of the spring 81 being compressed between the washer 82 and the boss portion 77, is again moved into engagement with one of the notches 80 of the rack 79, thus locking the steering column 10 in a given position. It should also be observed, that a slot 5a is provided in the fire wall 5, through which the outer tubular shaft 25 of the steering column 10 extends. The slot 5a is of sufficient length to allow the outer tubular shaft to move freely therein, when a vertical adjustment of the steering wheel 11 is desired by the driver of the motor vehicle.

Collapsible steering column

As is best shown in Figure 5, the steering wheel 11 has been pushed by the driver to a point where the second uppermost notch 53 is being engaged by the pawl 54. Again referring to Figure 5, it will be seen that the lower end of the inner tubular shaft 26 bears against a relatively light or upper spring 90. The relatively light or upper spring 90 is compressed between the lower end of the inner tubular shaft 26 and a washer 91, being penetrated loosely by the lower shaft 16. Confined between the washer 91, and the plug 27 of the outer tubular shaft 25, is a relatively heavy or lower spring 92. The proximal ends of springs 90, 92 may be interengaged, and the relative positions thereof may be reversed, if desired. When a longitudinal adjustment of the steering column 10 is to be made, the pressure created by the relatively light spring 90 is easily overcome by the operator releasing the longitudinal adjustment means 50, and pressing forward on the steering wheel 11. The springs 90, 92 are preferably coated with rubber or other similar material to minimize noise and increase their flexibility. The inner surface of the lower housing part is also preferably coated with powdered graphite or other lubricant.

As heretofore stated the pawl 54, through the action of the spring 57, creates enough pressure to hold the pawl 54 in engagement with any one of the notches 53. Upon a sudden stop, or impact of the motor vehicle with another object, the driver of the vehicle may be thrown forwardly against the steering wheel 11. The pressure of the driver's body against the steering wheel 11 would then be sufficient to push the inner tubular shaft 26 forwardly, causing the pawl 54 to ride out of engagement with a corresponding notch 53. In the case of a serious accident, the inner tubular shaft 26 would fully compress the relatively light spring 90 which, in turn, bearing against the washer 91 would compress the heavy spring 92. The cushioning effect of the upper and lower springs 90, 92 would be sufficient, in all but the most serious accidents, to prevent the driver of the motor vehicle from becoming impaled upon the steering column 10 and in most cases preventing serious chest or body injuries.

It will also be noted that the hexagonal portion of the upper shaft 15 will have bottomed in the bore 17, whereby any additional forward pressure upon the steering wheel 11 would cause the lower shaft 16 to ride longitudinally inside the bearing 28 and the plug 27. The splined shaft 20 of the universal joint 18, 19, would then slide telescopically inside the splined bore of the housing 21 of the universal joint 22, 23. It is thus seen that in the event of the motor vehicle having a serious accident, the steering column 10 through forward movement caused by the driver's body would not break the linkage to the wheels of the motor vehicle. After an accident has occurred or whenever the steering column 10 has been telescoped to where the pawl 54 has been forced from the last or uppermost notch 53 the steering column 10 may be returned to its normal position at which time the pawl 54 would again engage one of the notches 53, by the action of the upper and lower springs 91, 92.

In the drawings and specification there has been set forth a preferred embodiment of the invention, and although specific terms are employed they are used in a generic and descriptive sense only and not for purposes of limitation, the scope of the invention being defined in the claims.

I claim:

1. The combination with a steering mechanism for wheeled vehicles with a steering column having first and second telescopically interconnected tubular shafts, a telescopic steering rod extending longitudinally of and within the first and second shafts and being journaled in the distal ends of the first and second shafts, a steering wheel fixed to one end of said steering rod, means to connect the other end of the steering rod to a steering linkage, first and second means cooperatively urging said first and second tubular shafts to relatively extended positions, means fixedly supporting one of said tubular shafts in fixed relation to said vehicle, the other tubular shaft being adjacent to the steering wheel and being axially movable relative to said fixed one of the tubular shafts, means limiting the extent to which the first and second tubular shafts may be extended and also yieldably restraining said first and second tubular shafts from relative axial movement and said first urging means having lesser inherent force than said second urging means whereby, sudden impact of the vehicle will cause the operator thereof to apply sufficient pressure to the steering wheel to overcome said first urging means and cushion the initial movement of the steering wheel and whereby the second urging means will further absorb the shock of movement of the steering wheel under a greater pressure when said steering wheel has moved a predetermined distance relative to the fixed tubular shaft.

2. In a steering mechanism for a wheeled vehicle, said vehicle having a fire wall; the combination of a first tubular member extending upwardly and rearwardly from said fire wall at an angle from said fire wall, means for supporting the upper portion of said first tubular member in fixed relation to said vehicle, a second tubular member having its lower portion axially movable in said first tubular member, a telescopic steering rod loosely positioned within the first and second tubular members and having its lower portion journaled in the lower portion of the first tubular member and having its upper portion journaled in the upper portion of the second tubular member, a steering wheel fixed to the upper end of said steering rod, the lower end of the steering rod being adapted to be coupled to linkage for turning the ground wheels of the vehicle with rotation of the steering wheel and steering rod, an abutment in the lower portion of said first tubular member, a pair of co-axially alined and interengaging compression springs disposed within the first tubular member and having their distal ends engaging the lower end of the second tubular member and said abutment respectively, yieldable restraining means normally maintaining said first and second tubular members against relative axial movement in any one of a plurality of predetermined relatively extended positions axially of the first tubular member, and one of said springs being of lesser strength than the other of said springs whereby, upon sufficient force being applied to the steering wheel to overcome the force of said restraining means, the first compression spring will partially absorb the shock of movement of the steering wheel and the second tubular member under relatively light pressure whereupon the second spring will further absorb said shock under relatively greater pressure.

3. In a steering mechanism for a wheeled vehicle, said vehicle having a fire wall; the combination of a first tubular member extending upwardly and rearwardly from said fire wall at an angle from said fire wall, means for supporting the upper portion of said first tubular member in fixed relation to said vehicle, a second tubular member having its lower portion axially movable in said first tubular member, a telescopic steering rod loosely positioned within the first and second tubular members and having its lower portion journaled in the lower portion of the first tubular member and having its upper portion journaled in the upper portion of the second tubular member, a steering wheel fixed to the upper end of said steering rod, the lower end of the steering rod being adapted to be coupled to linkage for turning the ground wheels of the vehicle with rotation of the steering wheel and steering rod, an abutment in the lower portion of said first tubular member, a pair of coaxially alined and interengaging compression springs disposed within the first tubular member and having their distal ends engaging the lower end of the second tubular member and said abutment respectively, yieldable restraining means normally maintaining said first and second tubular members in predetermined relatively extended positions, and one of said springs being of lesser strength than the other of said springs whereby, upon sufficient force being applied to the steering wheel to overcome the force of said restraining means, the first compression spring will partially absorb the shock of movement of the steering wheel and the second tubular member under relatively light pressure whereupon the second spring will further absorb said shock under relatively greater pressure, manually operable means for releasing said restraining means whereby the compression springs permit manual adjustment of the second tubular member relative to the first tubular member, and means engageable by said restraining means upon being released to yieldably lock said second tubular member in any one of a plurality of predetermined positions axially of the first tubular member.

4. In a structure according to claim 3 wherein said yieldable restraining means comprises a detent mounted for substantial radial movement in a medial portion of the wall of said first tubular member, the outer surface of the wall of the second tubular member being provided with a plurality of longitudinally spaced notches therein adapted to be selectively engaged by the inner end of said detent whereby, upon said steering wheel being subjected to relatively heavy pressure, the detent may be forced out of its corresponding notch and into predetermined notches depending upon the amount of pressure applied to the steering wheel.

5. A structure according to claim 4 wherein said second tubular member is provided with a longitudinally extending keyway adjacent its lower end and extending through and being of greater depth than said notches, and a key on the inner end of said detent for engaging said keyway to prevent relative rotational movement between the first and second tubular members.

6. In an automotive vehicle having a steering linkage connected to ground wheels thereof, an upwardly and forwardly inclined floor portion and a stationary part spaced upwardly and forwardly from said lower portion; the combination of a steering mechanism comprising a two-part steering rod interconnected for relative axial sliding movement and for rotational movement together and extending at an angle through said floor portion and upwardly past said stationary part, means to connect the lower end of the steering rod with said linkage, a steering wheel fixed to the upper end of said steering rod, a two-part collapsible housing interconnected for relative axial sliding movement and within which said steering rod is disposed, operative connections between each of said rod parts and respective housing parts for causing conjoint axial movement and enabling relative rotational movement of said steering rod, cooperative relatively light spring means and relatively heavy spring means operated between housing parts for constantly urging said housing parts toward extended position, means limiting the extent to which said housing parts may be extended whereby, upon sudden impact of said vehicle, the two-part housing may be collapsed and the initial shock of relative collapsing movement of the housing parts will be absorbed by the relatively light spring means and subsequently the shock will be retarded or absorbed by the relatively heavy spring means.

7. A structure according to claim 6 wherein said limiting means comprises a detent mounted for substantially radial movement in one of said housing parts and having a rounded end, said other housing part having a longitudinally extending row of spaced concavities therein adapted to register, one at a time, with the rounded end of said detent, spring means normally urging said detent into engagement with the corresponding concavity and normally maintain the housing parts in predetermined relative positions, said detent being yieldable under predetermined impact pressure.

8. A structure according to claim 7 including manually operable means for selectively releasing and applying pressure to said spring means associated with said detent, whereby upon the pressure on the latter spring means being released, the steering wheel and one of said housing parts may be adjusted longitudinally relative to the other of said housing parts and pressure may then be applied to the latter spring means to maintain the detent in engagement in one of said concavities.

9. A structure according to claim 8 wherein one of said housing parts is provided with a longitudinally extending keyway therein extending through the plane of and being of greater depth than the corresponding concavities and the rounded end of said detent being provided with a key thereon engageable with said keyway to prevent relative rotational movement between said housing parts.

10. In an automotive vehicle having a steering column and a steering rod disposed within the steering column and a steering wheel mounted on the upper end of the steering rod, a pair of telescopic tubular members comprising the steering column, the steering wheel being mounted on one of the telescopic members, the steering rod also being telescopic, spring means comprising a weak spring and a stronger spring disposed end to end around the steering rod and engaging one end of the inner telescopic tubular member for moving the two telescopic tubular members away from each other, latch means under control of the operator for holding the two telescopic tubular members against relative movement, said steering column being pivoted at its upper end, latch means to prevent pivoted movement of the steering column, and means operated by the foot of the driver for releasing the last-mentioned latch means to allow the entire steering column to pivot about a point next to the driver, whereby the steering wheel may be adjusted to the desired elevation.

11. In an automotive vehicle having a steering column and a steering rod disposed within the steering column and a steering wheel mounted on the upper end of the steering rod, a pair of telescopic tubular members comprising the steering column, the steering wheel being mounted on one of the telescopic members, spring means comprising a weak spring and a stronger spring disposed end to end around the steering rod and engaging one end of the inner telescopic tubular member for moving the two telescopic tubular members away from each other, latch means under control of the operator for holding the two telescopic tubular members against relative movement, said steering column being pivoted at its upper end, foot operated latch means for holding the steering column against pivoted movement and means operated by the foot of the driver for releasing the foot operated latch means to allow the entire steering column to pivot about a point next to the driver, whereby the steering wheel may be adjusted to the desired elevation.

12. In an automotive vehicle having a steering column and a steering rod disposed within the steering column and a steering wheel mounted on the upper end of the steering rod, a pair of telescopic tubular members comprising the steering column, the steering wheel being mounted on one of the telescopic members, spring means comprising a weak spring and a stronger spring disposed end to end around the steering rod and engaging one end of the inner telescopic tubular member for moving the two telescopic tubular members away from each other, latch means under control of the operator for holding the two telescopic tubular members against relative movement, said steering column being pivoted at its upper end, foot operated latch means for holding the steering column against pivoted movement and means for releasing the foot operated latch means to allow the entire steering column to pivot about a point next to the driver, whereby the steering wheel may be adjusted to the desired elevation.

13. In an automotive vehicle having a collapsible steering column, said steering column being composed of two tubular members and a steering rod disposed within the tubular members, resilient means normally forcing the two tubular members apart from each other, a steering wheel mounted on the steering rod, means for allowing the two tubular members to move toward each other for collapsing said steering column, said steering column being pivoted for swinging movement, means locking the steering column against swinging movement and foot controlled means for releasing the means for locking the steering column against swinging movement so that the steering column upon impact on the steering wheel may swing upwardly in a clockwise direction when the foot controlled means are actuated.

14. In an automotive vehicle having a collapsible steering column, said steering column being composed of two tubular members and a steering rod disposed within the tubular members and said steering rod also being collapsible, resilient means normally forcing the two tubular members apart from each other, a steering wheel mounted on the steering rod, means releasable by the driver for allowing the two tubular members to move toward each other for collapsing said steering column, said steering column being pivoted for swinging movement, means locking the steering column against swinging movement and foot controlled means for releasing the means for locking the steering column against swinging movement.

15. An improved collapsible steering column assembly comprising a pair of tubular members, a collapsible steering rod disposed within the tubular members said steering rod comprising an upper and a lower part interconnected for relative axial sliding movement and for rotational movement, resilient means normally forcing said tubular members apart from each other, a steering wheel mounted on the upper end of the upper part of said steering rod, and manually operable means comprising a hand lever for permitting said tubular members to be adjusted with respect to each other to vary their effective length, one part of said steering rod being constrained to move axially with one of said tubular members to vary the effective length of said steering rod at the same time that the effective length of said tubular members is varied, whereby said steering column assembly may be collapsed by shortening the effective lengths of said tubular members and said steering rod.

16. In a steering assembly having a steering column extending upwardly from a floor portion, a steering rod positioned within the steering column and a steering wheel secured on the upper end of the steering rod, means for varying the height of the steering wheel with respect to the lap of a driver comprising means for pivotally mounting the steering column intermediate its ends, and latch means positioned adjacent the lower end of the steering column, said latch means comprising a housing fixed about the steering column, a rack fixed to the floor portion, and releasable locking means operably positioned between said housing and rack for maintaining the steering column in a predetermined adjusted position.

References Cited in the file of this patent

UNITED STATES PATENTS

| | | |
|---|---|---|
| 2,079,536 | Thurber | May 4, 1937 |
| 2,140,319 | Heppner et al. | Dec. 13, 1938 |
| 2,511,165 | Lyman | June 13, 1950 |
| 2,639,626 | Snyder | May 26, 1953 |
| 2,716,355 | Schmid | Aug. 30, 1955 |
| 2,770,981 | Fieber | Nov. 20, 1956 |
| 2,828,646 | Farmer | Apr. 1, 1958 |
| 2,836,079 | Salch | May 27, 1958 |

FOREIGN PATENTS

| | | |
|---|---|---|
| 711,605 | France | June 30, 1931 |